United States Patent [19]
Ulichney

[11] Patent Number: 5,745,259
[45] Date of Patent: *Apr. 28, 1998

[54] VOID AND CLUSTER APPARATUS AND METHOD FOR GENERATING DITHER TEMPLATES

[75] Inventor: Robert Alan Ulichney, Stow, Mass.

[73] Assignee: Digital Equipment Corporation, Maynard, Mass.

[*] Notice: The term of this patent shall not extend beyond the expiration date of Pat. No. 5,535,020.

[21] Appl. No.: 592,913

[22] Filed: Jan. 29, 1996

Related U.S. Application Data

[63] Continuation of Ser. No. 961,244, Oct. 15, 1992, Pat. No. 5,535,020.

[51] Int. Cl.$^6$ ...................................................... H04N 1/40
[52] U.S. Cl. ........................ 358/457; 358/455; 358/456
[58] Field of Search .................................. 358/534–536, 358/455–458; 382/251–253, 270–271, 210, 215–217; 395/109, 164; H04N 1/403, 1/405

[56] References Cited

U.S. PATENT DOCUMENTS

| | | | |
|---|---|---|---|
| 3,739,082 | 6/1973 | Lippel | 178/6 |
| 4,507,685 | 3/1985 | Kawamura . | |
| 4,578,714 | 3/1986 | Sugiura et al. . | |

(List continued on next page.)

FOREIGN PATENT DOCUMENTS

| A 0 593 304 | 10/1993 | European Pat. Off. . |
|---|---|---|
| WO 91/12686 | 8/1991 | WIPO . |

OTHER PUBLICATIONS

Theophano Mitsa et al., "The Construction and Evaluation of Halftone Patterns with Manipulated Power Spectra", Raster Imaging and Digital Typography II, 1991, pp. 90–97.

J. Sullivan et al., "Design of Minimum Visual Modulation Halftone Patterns", IEEE Transactions on Systems, Man. and Cybernetics, vol. 21, No. 1, Jan./Feb. 1991, pp. 33–38.
Robert A. Ulichney, "Dithering with Blue Noise", Proceedings of the IEEE, vol. 76, No. 1, Jan. 1988, pp. 56–79.
J. P. Allebach et al., "Random quasiperiodic halftone process", J. Opt. Soc. Am., vol. 66, No. 9, Sep. 1976, pp. 909–917.
B. E. Bayer, "An Optimum Method for Two–Level Rendition of Continuous–Tone Pictures", Proc. IEEE Int. Conf. Commun., Conference Record, 1973, pp. 26–11 –26–15.
Theophano Mitsa et al., "Digital halftoning using a blue noise mask", Proc. SPIE, Image Processing Algorithms and Techniques II, vol. 1452, Feb. 25–Mar. 1, 1991, pp. 47–56.

(List continued on next page.)

*Primary Examiner*—Edward L. Coles, Sr.
*Assistant Examiner*—Kimberly A. Williams
*Attorney, Agent, or Firm*—Lindsay G. McGuinness; Denis G. Maloney; Arthur W. Fisher

[57] ABSTRACT

An apparatus for dithering an input image to produce an output array for representation on an output device is described. The apparatus includes an input device to store input image pixels having a first plurality of chrominance or luminance levels; a dithering system including a dither template including an M by N matrix of integer threshold values, the uniform distribution of threshold values throughout the dither template possessing homogeneous attributes. The apparatus further includes a normalizer unit for normalizing the threshold values of the dither template for storage in a dither matrix according to the first plurality of chrominance or luminance levels of the input image pixels and a second plurality of chrominance or luminance levels of the output array and a summation unit to add the input image pixel chrominance or luminance values to the normalized threshold values of the dither matrix. A quantizer unit is provided to adjust summation unit output to a closest output array chrominance or luminance levels of an output device.

9 Claims, 14 Drawing Sheets

U.S. PATENT DOCUMENTS

| | | | |
|---|---|---|---|
| 4,675,831 | 6/1987 | Ito et al. | 364/518 |
| 4,736,254 | 4/1988 | Kotera et al. . | |
| 4,835,599 | 5/1989 | Sigel . | |
| 4,920,501 | 4/1990 | Sullivan et al. | 364/518 |
| 5,077,615 | 12/1991 | Tsuji | 358/298 |
| 5,111,310 | 5/1992 | Parker et al. | 358/456 |
| 5,196,924 | 3/1993 | Lumelsky et al. . | |
| 5,208,871 | 5/1993 | Eschbach . | |
| 5,210,623 | 5/1993 | Weldy | 358/458 |
| 5,214,517 | 5/1993 | Sullivan et al. | 358/456 |
| 5,226,094 | 7/1993 | Eschbach . | |
| 5,291,309 | 3/1994 | Semasa | 358/455 |
| 5,293,482 | 3/1994 | Lambidakis | 395/164 |
| 5,317,418 | 5/1994 | Lin | 358/456 |
| 5,333,260 | 7/1994 | Ulichney | 358/448 |
| 5,363,210 | 11/1994 | Sasaki et al. | 358/448 |
| 5,363,213 | 11/1994 | Coward et al. | 358/455 |
| 5,371,515 | 12/1994 | Wells et al. | 345/149 |
| 5,375,203 | 12/1994 | Lambidakis | 395/162 |
| 5,535,020 | 7/1996 | Ulichney | 358/456 |

OTHER PUBLICATIONS

T. Mitsa et al., "On the Manipulation of Power Spectra of Halftone Patterns", 1991, pp. 471–478.

Lawrence Gilman Roberts, "Picture Coding Using Pseudo-Random Noise", 1962, pp. 145–154.

Stuart C. Wells et al., "Dithering for 12–Bit True Color Graphics", IEEE Computer Graphics & Applications, Sep. 1991, pp. 18–29.

Robert A. Ulichney, "Frequency Analysis of Ordered Dither", SPIE vol. 1079 Hard Copy Output (1989), pp. 361–373.

Robert Ulichney, "Digital Halftoning", Cambridge: The MIT Press, 1987, pp. 127–341.

J. Allebach, "Random Nucleated Halftone Screening", Photographic Sciene and Engineering, vol. 22, No. 2, 1978, pp. 89–91.

| 5 | 9 | 6 | 8 | 5 | 9 | 6 | 8 | 5 | 9 | 6 | 8 | 5 | 9 | 6 | 8 |
|---|---|---|---|---|---|---|---|---|---|---|---|---|---|---|---|
| 12 | 0 | 13 | 3 | 12 | 0 | 13 | 3 | 12 | 0 | 13 | 3 | 12 | 0 | 13 | 3 |
| 7 | 7 | 4 | 10 | 7 | 7 | 4 | 10 | 7 | 7 | 4 | 10 | 7 | 7 | 4 | 10 |
| 14 | 2 | 11 | 1 | 14 | 2 | 11 | 1 | 14 | 2 | 11 | 1 | 14 | 2 | 11 | 1 |
| 5 | 9 | 6 | 8 | 5 | 9 | 6 | 8 | 5 | 9 | 6 | 8 | 5 | 9 | 6 | 8 |
| 12 | 0 | 13 | 3 | 12 | 0 | 13 | 3 | 12 | 0 | 13 | 3 | 12 | 0 | 13 | 3 |
| 7 | 7 | 4 | 10 | 7 | 7 | 4 | 10 | 7 | 7 | 4 | 10 | 7 | 7 | 4 | 10 |
| 14 | 2 | 11 | 1 | 14 | 2 | 11 | 1 | 14 | 2 | 11 | 1 | 14 | 2 | 11 | 1 |
| 5 | 9 | 6 | 8 | 5 | 9 | 6 | 8 | 5 | 9 | 6 | 8 | 5 | 9 | 6 | 8 |
| 12 | 0 | 13 | 3 | 12 | 0 | 13 | 3 | 12 | 0 | 13 | 3 | 12 | 0 | 13 | 3 |
| 7 | 7 | 4 | 10 | 7 | 7 | 4 | 10 | 7 | 7 | 4 | 10 | 7 | 7 | 4 | 10 |
| 14 | 2 | 11 | 1 | 14 | 2 | 11 | 1 | 14 | 2 | 11 | 1 | 14 | 2 | 11 | 1 |
| 5 | 9 | 6 | 8 | 5 | 9 | 6 | 8 | 5 | 9 | 6 | 8 | 5 | 9 | 6 | 8 |
| 12 | 0 | 13 | 3 | 12 | 0 | 13 | 3 | 12 | 0 | 13 | 3 | 12 | 0 | 13 | 3 |
| 7 | 7 | 4 | 10 | 7 | 7 | 4 | 10 | 7 | 7 | 4 | 10 | 7 | 7 | 4 | 10 |
| 14 | 2 | 11 | 1 | 14 | 2 | 11 | 1 | 14 | 2 | 11 | 1 | 14 | 2 | 11 | 1 |

FIG. 1
(PRIOR ART)

VOID AND CLUSTER APPARATUS AND METHOD FOR GENERATING DITHER TEMPLATES

This is a continuation of application Ser. No. 07/961,244 filed on Oct. 15, 1992, now U.S. Pat. No. 5,535,020.

RELATED APPLICATIONS

The following application for a U.S. Patent is related to the present application:

Inventor: Ulichney et al., Title: Imaging System with Multi-Level Dithering Using Two Memories, filed on even date with the present application, U.S. Pat. No. 5,333,262, issued Jul. 16, 1994.

FIELD OF THE INVENTION

This invention relates generally to image processing, and more particularly to providing an output image through dithering which is perceptually similar to an input image using fewer chrominance or luminance levels than are used by the original input image.

BACKGROUND OF THE INVENTION

As it is known in the art, imaging systems are used to translate a given input image to an output image. For example, a computer screen may register a given input image which is subsequently transferred to an output device, such as a printer. A problem may exist when transferring a multi-level chrominance or luminance (color or brightness) input image to an image generating output device because typical output devices are capable of displaying fewer chrominance or luminance levels for each pixel than are found in the input image.

Commonly, the effect of shading is achieved through digital halftoning, wherein each input level is simulated by varying the ratio of output chrominance or luminance levels in a small area of the screen. A drawback of digital halftoning is that visually sharp edges may be found in a resultant output image due to neighboring output pixels with different output chrominance or luminance levels. Dithering, which adds distinct integer values to the each pixel, was introduced to alleviate the sharp edges seen in halftoned output images. The conversion of an input image pixel array to an output image pixel array using dithering is well known in the art, see for example Robert A. Ulichneys *Digital Halftoning*, MIT Press, 1987, Chapter 5.

Ordered dithering uses a dither matrix whose elements are integer threshold values. The dither matrix is commonly smaller than the input image, and repeatedly laid down over the image in a periodic manner, thus tiling the input image. An example of a 4×4 dither matrix 250 tiled over a 16×16 input image 200 is shown in FIG. 1. Each element of the dither matrix 250 is an integer representing a threshold value. For example, with a bilevel output device, the threshold value determines whether or not an input pixel at that location will be turned "on", i.e. a black pixel or "off", i.e. a white pixel. When the input pixel chrominance or luminance value is greater than the threshold value, the pixel is turned "on", if the chrominance or luminance value of the pixel is less than or equal to the threshold value, the pixel is turned "off". For example, if the 16×16 input image in FIG. 1 had 16 possible chrominance or luminance levels {0,1,2 . . . 15} for display on a bilevel output device, a given pixel 210 would be black only if the chrominance or luminance value of the original pixel of the input image 200 is greater than a 5, for example. Note that the highest threshold in the dither matrix is 14, thus ensuring that all input pixels with an chrominance or luminance level of 15 (the highest possible chrominance or luminance level in this example) will always be turned "on" in the output image. Because the dither matrix thresholds essentially determine which pixels of the input image will be displayed on the output device, the ordering of the threshold values in the dither matrix is related to the quality of the output image.

Various ordered dithering methods for arranging threshold values within a dither matrix have been developed. One problem with these ordered dithering methods is that regular patterns appear in the output images due to the tiling of the ordered dither matrix over the input image. This provides an output image which appears artificially processed. In addition, the ordered dither matrices tend to produce an output image with increased low frequency spatial characteristics. Low frequency spatial characteristics in an output image introduce residual visual artifacts which diminish the quality of the output image.

One approach to overcome this problem is the use of randomness to break up the rigid regularity of ordered dither. An example of the use of randomness is discussed by J. P. Allebach in 1976 in a paper entitled *Random Quasi-Periodic Halftone Process*, J. Opt. Soc. Am., vol. 66, pp. 909–917. Subsequent efforts by T. Mitsa and K. Parker are described in *Digital Halftoning Using a Blue Noise Mask*, Proc. SPIE, Image Proc. Algorithms and Techniques II, Feb. 25–March 1, vol 1452, pp 47–56. Mitsa and Parker present a method to produce a "blue noise mask" ordered dither matrix for use in generating an output image with given spatial frequency domain characteristics, mimicking the "blue noise" patterns achieved with a compute intensive error diffusion algorithm described by Robert A. Ulichney in *Digital Halftoning*, Chapter 8, MIT Press, 1987. However, one problem with Mitsa and Parker's approach is that the complex process of generating the "blue noise mask" increases hardware complexity.

SUMMARY OF THE INVENTION

According to one aspect of the invention, an apparatus for dithering an input image to produce an output array for representation on an output device comprises an input device to store input image pixels having a first plurality of chrominance or luminance levels; a dithering system including a dither template comprising an M by N matrix of integer threshold values, the uniform distribution of threshold values throughout the dither template possessing homogeneous attributes; a normalizer unit for normalizing the threshold values of the dither template for storage in a dither matrix according to the first plurality of chrominance or luminance levels of the input image pixels and a second plurality of chrominance or luminance levels of the output array; a summation unit to add the input image pixel chrominance or luminance values to the normalized threshold values of the dither matrix; and a quantizer unit to adjust summation unit output to a closest output array chrominance or luminance level.

An improved method for ordering the threshold values of the dither template includes the steps of providing a binary pattern array of first and second type bit elements also having M by N locations and a rearranging the bit elements in the array. In particular the step of rearranging the bit elements includes the step of wrapping around indices of the bit elements to iteratively move the bit elements at the peripheries of the array to bit element locations within the pattern array until the pattern of bit elements is uniformly distributed, that is the first and second type bit elements are isotopically distributed in all directions. The selection of a bit for movement within the pattern array is dependant on the binary value of the bit and a spatial characteristic of the bit to all remaining bits of a predetermined binary value, for example with the binary value of "1". The spatial characteristic used in the selection process differs depending on the binary value of the bit element.

For example, for each pattern array bit element having a value "0", the rearrangement method locates the "0" bit element which has the lowest number of neighboring "1" bit elements. This "0" bit element is termed the largest void location. In contrast, for each pattern array bit element having a value "1", the rearrangement method locates the "1" bit element with the highest number of neighboring "1" bit elements. This "1" bit element is termed the largest cluster location. Thus, the rearrangement method moves the "1" bit element from the largest cluster location to the largest void location.

When a bit element with a value of "1" which has the largest number of neighboring "1" bit elements would, if the binary value of the bit element were a changed to a "0", also be the "0" bit element with the smallest number of neighboring "1" bit elements, the "0" bit elements and "1" bit elements are uniformly distributed throughout the pattern array, (that is, the "0" and "1" bit elements are isotopically distributed in all directions) and consequently the bit elements form a pattern with homogeneous attributes. The pattern array is subsequently used as a working binary pattern for choosing the threshold values of the dither template. Each element of the dither template is assigned a threshold value in accordance with the value of the bit element in a corresponding location of the working binary pattern and that bit element's cluster or void characteristic.

There is advantageously a greater number of one binary value of the bit elements in the pattern array, and this bit element value is termed the majority bit element. Correspondingly, the other binary value bit element is termed the minority bit element. A cluster is a term used to describe a grouping of minority bit elements. A void is a term used to describe a space between minority bit elements. A cluster filter and a void filter are used during the creation of the pattern array and during the assignment of the thresholds to locate the largest cluster location and the largest void location, respectively, in a binary pattern. Both the cluster filter and the void filter advantageously employ a wrap around filtering property which effectively simulates neighboring pattern arrays to accurately locate clusters and voids, even when dealing with the outer edges of the pattern array.

In a preferred embodiment of the invention, during the creation of the pattern array, the cluster filter locates the minority bit element with the highest number of neighboring minority bit elements (the largest cluster location) . The minority bit element is removed from the largest cluster location and a majority bit element is inserted in its place. The void filter locates the majority bit element with the lowest number of neighboring minority bit elements (the largest void location). The removed minority bit element is placed at the largest void location. The process of moving minority bit elements from largest cluster locations to largest void locations continues until the removal of a minority bit element from the largest cluster location creates the largest void location. At this point, the minority bit elements and the majority bit elements are uniformly distributed throughout the pattern array, and the pattern array is said to possess homogeneous attributes.

The pattern array having homogeneous attributes is used as a working binary pattern for determining the threshold values at each dither template location. In one embodiment of the invention, the homogenous pattern array is stored in memory and copied to provide a working binary pattern. The cluster filter is iteratively applied to the working binary pattern to identify a minority bit element at the largest cluster location. The minority bit element is removed from the largest cluster location, a majority bit element is inserted in its place, and a threshold value is entered in the corresponding location of the dither template. The threshold value entered is equal to the number of minority bit elements remaining in the working binary pattern after the minority bit element has been removed. The cluster filter continues to provide largest cluster locations and threshold values are assigned to these locations in the dither template until no minority bit elements remain in the working binary pattern.

At this point in the process, the dither template has been assigned a threshold value at every location which originally contained a minority bit element in the working binary pattern. The homogeneous pattern array is again copied to provide a working binary pattern. The void filter is iteratively applied to the working binary pattern, each time identifying a majority bit element at the largest void location. The majority bit element at the largest void location is removed, a minority bit element is inserted in its place, and a threshold value is inserted in the corresponding location of the dither template. The value of the inserted threshold is equivalent to the number of minority bit elements in the working binary pattern before the insertion of the new minority bit element. The void filter continues to supply majority bit element locations and thresholds are entered in corresponding locations of the dither template until the number of minority bit elements is greater than one half the total amount of bit elements within the working binary pattern.

Because there are now more than one half of the original value of minority bit elements in the pattern array, the bit element value which was previously the value of a minority bit element is now termed a majority bit element. Likewise, the bit element value which was previously a majority bit element is now termed a minority bit element. The cluster filter is again applied to the working binary pattern, identifying a minority bit element at the largest cluster location. A majority bit element is inserted in its place, and a threshold value is entered in the corresponding location of the dither template. The threshold entered is a value equal to the number of majority bit elements in the working binary pattern before insertion of the latest majority bit element. The cluster filter continues to provide largest cluster locations and threshold values continue to be entered in like locations of the dither template until no minority bit elements remain in the working binary pattern. At this point, every dither template location has been assigned a threshold value within the range 0 to $(M \times N)-1$.

Because the threshold values were determined by locating voids and clusters in a pattern having a uniformly distributed pattern of minority and majority pixels, the resultant dither template thresholds are therefore uniformly distributed throughout the dither template. As a result, an output image produced by an embodiment of the present invention which advantageously employs the wrap around filtering property referred to above, possesses few low frequency spatial characteristics. Thus, when the input image is tiled by dither templates, the output image will not suffer the regular and rectangular visual effects encountered in prior art ordered dithering methods.

A void and cluster method of dithering embodying the invention permits a small dither template to be replicated over a large input image while ensuring a homogeneous and visually pleasing output image. A simple iterative search technique for locating clusters and voids minimizes the expense of memory and hardware complexity in the generation of a dither template.

Other objects, features and advantages of the invention will become apparent from a reading of the description of the preferred embodiment of the invention when taken in conjunction with the drawings in which like reference numerals refer to like elements in the several views.

BRIEF DESCRIPTION OF THE DRAWINGS

FIG. 1 is an illustration showing the tiling of a prior art 4×4 dither matrix over a 16×16 input image;

FIGS. 14 and 15 are output images rendered from the same input image, wherein

DESCRIPTION OF THE PREFERRED EMBODIMENT

Figure 2:
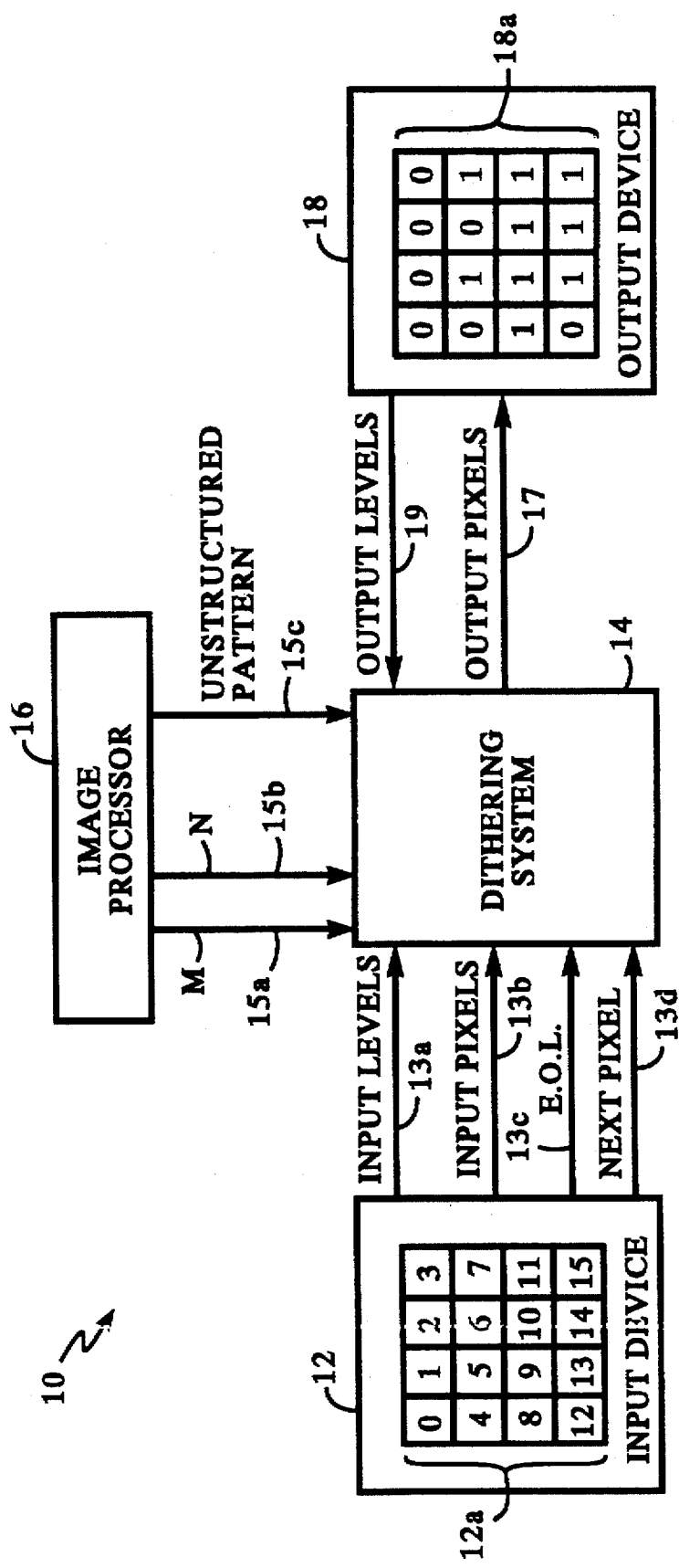
FIG. 2 is a block diagram illustrating an image processing system using a dithering system in accordance with the present invention.

Referring now to FIG. 2, a monochrome image processing system 10 is shown to include an input device 12 such as a computer memory for storing an input image 12a, an image processor 16 used to control the processing of the input image 12a, and an output device 18 such as a printer, to display the input image 12a after processing as an output image 18a. Each of these devices provide outputs along lines 13a, 13b, 13c, 13d, 15a, 15b, 15c and 19 to a dithering system 14. Dithering system 14 translates input pixel data on line 13b, which may have up to X chrominance or luminance levels, into output pixel data on line 17, having up to Y chrominance or luminance levels.

Frequently, in transferring data between devices in an image processing system, the input device 12 is capable of representing more chrominance or luminance levels than the output device 18. Signal "InputLevels" on line 13a is an binary value signal representing the discrete number of chrominance or luminance levels that the input device 12 is capable of displaying. Signal "OutputLevels" on line 19 is an binary value signal which represents the discrete number of chrominance or luminance levels that the output device 18 is capable of displaying. The dithering system 14 thus translates input pixels on line 13a, having InputLevels chrominance or luminance levels into output pixels on line 18a, having OutputLevels chrominance or luminance levels (where OutputLevels is less than or equal to InputLevels), thereby providing an output image 18a which is capable of being displayed on the output device 18 and that is visually similar to the input image 12a.

(For reasons of clarity, chrominance or luminance levels may also be termed representation levels in the remainder of this specification).

By way of example, a 4×4 input image 12a, comprising 16 integer pixel values is shown in FIG. 2. As shown by input image 12a, the input device 12 is capable of displaying 16 representation levels [numbered 0 . . . 15 (a binary range between 0000 . . . 1111)]. However, the output device 18 of this example is capable of displaying only two representation levels (numbered 0 . . . 1), as shown in the resultant output image 18a. The dithering system 14 thus serves to translate the input image 12a into a visually similar output image 18a.

The image processor 16 supplies to the dithering system 14 initial information including binary values indicating a number of rows and a number of columns (on line 15a and line 15b respectively) of a dither matrix which is used in the dithering system 14. An unordered binary signal sequence on line 15c, supplied by the image processor 16, is used to initialize memory within the dithering system 14, and will be discussed in more detail later in the specification.

Figure 3:
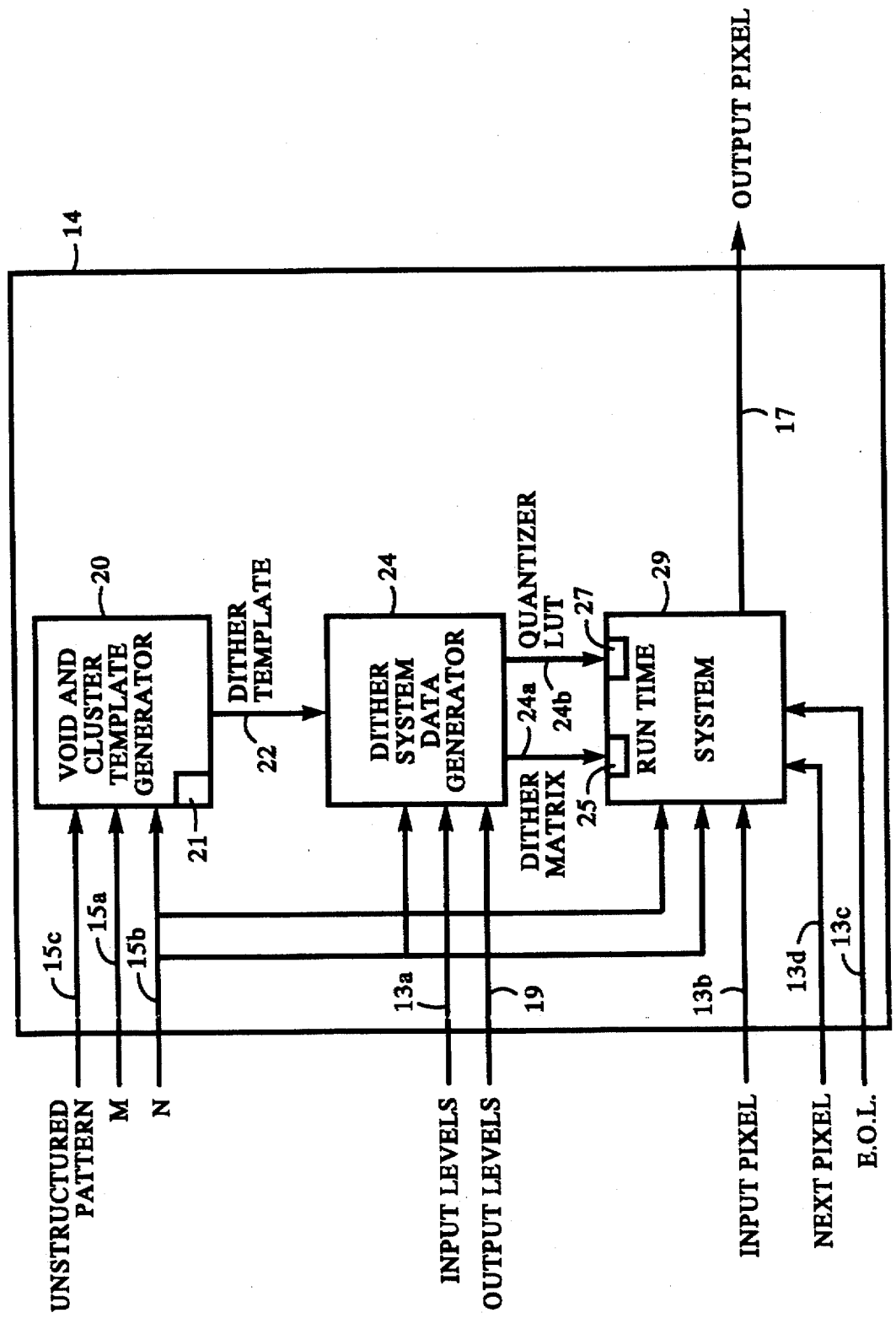
FIG. 3 is a block diagram illustrating the dither system of FIG. 2.

Referring now to FIG. 3, the dither system 14 is shown to include a void and cluster template generator 20 which generates a M row by N column dither template for storage in a dither template memory 21. Each element of the M by N dither template is an integer threshold value between 0 and M×N−1. Binary values indicating the number of rows M and number of columns N of the dither template are provided to the template generator 20 by the image processor 16 (shown in FIG. 2) via lines 15a and 15b respectively. An arbitrary, binary pattern, preferably an unordered binary pattern is also provided by the image processor 16 to the template generator 20 over line 15c to initialize a state within the template generator 20. The unordered binary pattern comprises a sequence of M×N "0" and "1" value bit elements, which is used by the template generator 20 in providing the dither template, as will be further discussed below. The arbitrary binary pattern can be any pattern but preferably should have at least one "0" value bit element (void) or one "1" value bit element (cluster) within the pattern of otherwise opposite type elements, i.e. clusters or voids, respectively.

Data in dither template memory 21 may be utilized by a plurality of input devices with various InputLevels, for generating an output image on a plurality of output devices with various OutputLevels. Thus, once the time consuming process of generating the integer threshold values in dither template memory 21 has been completed, the dither template need not be regenerated during system operation.

The dithering system 14 further includes a dither system generator 24. After a threshold value has been stored in each of the M×N locations of dither template memory 21, the dither template is transmitted from dither template memory 21 over bus 22 to the dither system data generator 24.

Normalization of the integer threshold values in dither template memory 21 occurs in the dither system data generator 24, which combines threshold values from dither template memory 21, InputLevels on line 13a, OutputLevels on line 19, and the row number M and column number N to provide a dither matrix. The formula for normalization used in the preferred embodiment is shown as follows, where dt(x,y) refers to the threshold value at the x,y location of dither template memory 21, $\Delta_Q$ refers to the distribution of InputLevels to OutputLevels (quantization steps), $\Delta_{dm}$ is the normalization factor, and dm(x,y) refers to the normalized threshold value at the x,y location of dither matrix memory 25:

$$\Delta_Q = \frac{\text{InputLevels} - 1}{\text{OutputLevels} - 1} \quad \text{(Equation Set I)}$$

$$\Delta_{dm} = \frac{\Delta_Q}{M*N}$$

$$dm(x,y) = \text{integer}\{\Delta_{dm}(dt(x,y) + \frac{1}{2})\}$$

The dithering system 14 further includes a run time system 29 which translates input pixels on line 15b having InputLevels representation levels into output pixels on line 17 having OutputLevels representation levels. The normalized threshold values of the dither matrix are transmitted by the dither system data generator 24 over bus 24a to the run time system 29 and stored in dither matrix memory 25. In addition, the dither system data generator 24 provides a quantizer Look Up Table (LUT) containing mapping data, which is transmitted to the run time system 29 on line 24b and stored in quantizer LUT memory 27. Further information about the quantizer LUT will be discussed later in this specification. The run time system 24 utilizes data from dither matrix memory 25 and quantizer LUT memory 27 to translate the input pixels on line 13b into output pixels on line 17 at the real time pixel rate of the input device 12 (FIG. 2).

The normalized integer thresholds in dither matrix memory 25 and the mapping data in quantizer LUT memory 27 may be used repeatedly in the dither system 14 provided that the image processing continues to occur between devices with like InputLevels and OutputLevels. If, however, a new input device with a different number of InputLevels or a new output device with a different number of OutputLevels uses the dithering system 14, the dither system data generator 24 must regenerate the data in dither matrix memory 25 and the mapping data in quantizer LUT memory 27.

Figure 4:
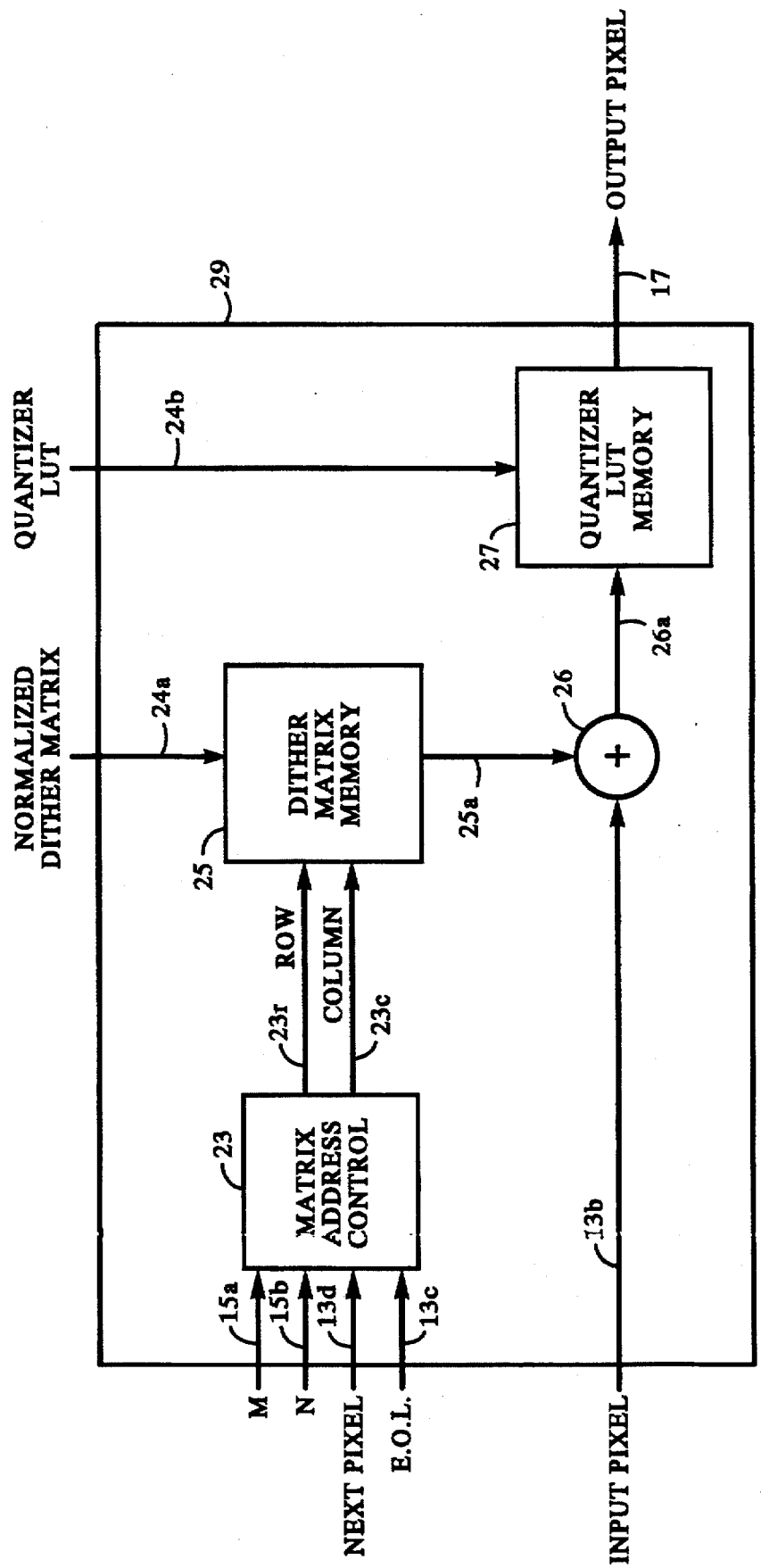
FIG. 4 is a block diagram illustrating a run time system used in the dither system of FIG. 3.

Referring now to FIG. 4, the normalized threshold values in dither matrix memory 25 and the mapping data in quantizer LUT memory 27 are used by the run time system 29, which operates at an input pixel rate (dictated by the speed of the input device 12 (FIG. 2)). An input image 12a (FIG. 2), stored in memory in the input device 12, is fed one pixel at a time on line 13b into the run time system 29 when an output image is requested by the image processor 16 (FIG. 2). As each input pixel is fed from the input device 12 on line 13b into the run time system 29, the matrix address control unit 23 receives a NEXT PIXEL input on line 13d from the input device 12, indicating that a new threshold value should be supplied from dither matrix memory 25 for the dithering operation. The matrix address control unit 23 subsequently supplies a new row address on line 23r and a new column address on line 23c for selecting a normalized threshold value from dither matrix memory 25. A selected normalized threshold value is transmitted from the dither matrix memory 25 on line 25a to an adder 26.

Advantageously, dither matrix memory 25 has fewer rows and columns than the input image 12a (FIG. 2), and the normalized threshold values of dither matrix memory 25 are effectively tiled over the pixel array representing the input image 12a. For example, for a 4×4 dither matrix replicated over a 16×16 input image integer thresholds of the 4×4 dither matrix are replicated over the 16×16 input image, with the first row of normalized dither matrix thresholds repeated over successive groups of four input image row locations. When all pixels from the first row of the input image 12a have been transmitted on line 13b and added to a corresponding normalized threshold on line 25a by adder 26 and providing corresponding SUMs on line 26a to quantizer LUT memory 27, the input device 12 asserts an End of Line (EOL) signal on line 13c.

When EOL is asserted, the matrix address control unit 23 addresses the second row of dither matrix memory 25 and that row of four normalized dither thresholds is added by adder 26 to successive groups of four input pixels from the second row of the input image 12a, providing corresponding SUMs on line 26a to quantizer LUT memory 27. When the last row of integer thresholds of the normalized dither matrix memory 25 has been repeatedly added by adder 26 to pixels in a row of an input image 12a, the matrix address control unit 23 effectively wraps around and again addresses the first row of dither matrix memory 25 for normalized threshold values to add to the next row of pixels of the input image 12a. This process continues until all rows of the input image 12a have been added by adder 26 to normalized thresholds from dither matrix memory 25, and each SUM value has been transmitted on line 26a to address quantizer LUT memory 27.

As applied in the embodiment of the present invention, quantization is a technique by which the distribution of the input representation levels with respect to the output representation levels, measured in quantizing steps $\Delta_Q$, is determined. For example, if there were 256 available input representation levels and 4 available output representation levels the $\Delta_Q$ is given by: $\Delta_Q = (256-1)/(4-1) = 85$ (as calculated using Equation Set I above). Therefore, there are as many as 85 possible input representation levels mapped to each output representation level. In the embodiment of the present invention, the distribution of input representation levels is provided to be symmetric around each output representation level, as shown in the table below:

TABLE I

| Input Representation Level | Output Representation Level |
| --- | --- |
| 0–42 | 0 |
| 43–127 | 1 |
| 128–212 | 2 |
| 213–255 | 3 |

Therefore, in this example, quantizer LUT memory 27 is arranged having 256 addressable entries, each entry containing an output chrominance level between 0 and 3. The generation and use of the quantizer LUT is described in greater detail in U.S. Pat. No. 5,333,262, Imaging System with Multi-Level Dithering Using Two Memories, by Ulichney et al., filed on even date with the present application.

Although the discussion has proceeded with reference to a monochrome imaging system, a color system could be implemented by increasing the number of run time systems 29. Therefore, for a 3 color video system (red, green and blue), there would be three separate run time systems, although all three systems would utilize the same dither matrix memory 25 and quantizer LUT memory 27.

Figure 5:
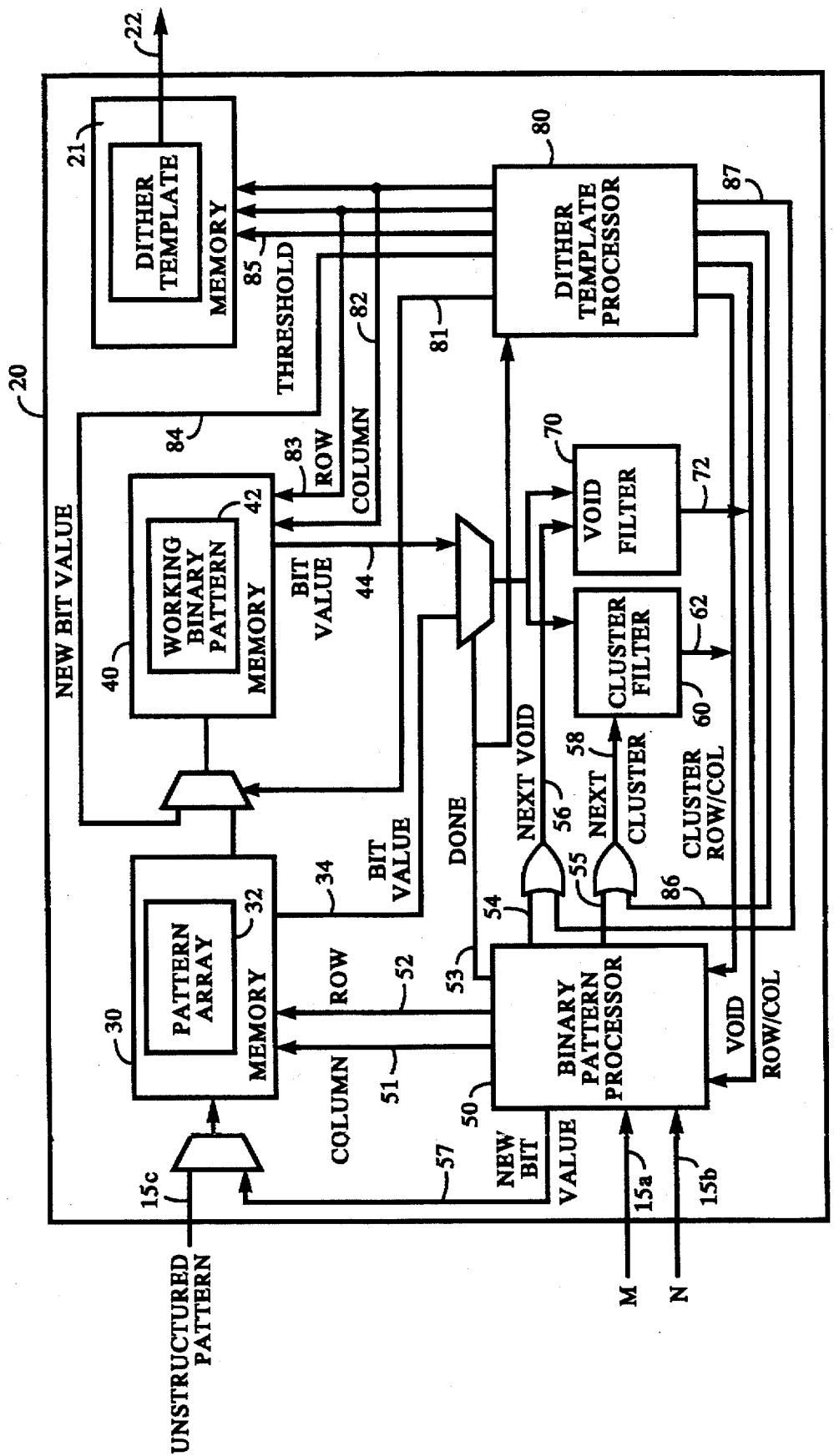
FIG. 5 is a block diagram illustrating a specific embodiment of a void and cluster template generator for use in the dithering system of FIG. 3.

Referring now to FIG. 5, a binary pattern processor 50 which is used in conjunction with a cluster filter 60 and a void filter 70 to write a pattern array 32 of black and white bit elements to a pattern array memory 30 are shown. The contents of the pattern array memory 30 are copied in whole to a working binary pattern 42 (stored in working binary pattern memory 40) as necessary during operation. A dither template processor 80 acts together with the cluster filter 60 and void filter 70 on the bit elements in the working binary pattern 42 to produce an array of integer threshold values termed a dither template for storage in dither template memory 21. The pattern array memory 30, the working binary pattern memory 40 and the dither template memory 21 each contain M×N memory locations. Details of the interaction between the binary pattern processor 50, the pattern array memory 30, the working binary pattern memory 40, the dither template processor 80, the cluster filter 60 and the void filter 70, which together function to provide integer thresholds for storage in dither template memory 21, are discussed below.

The assignment of integer threshold values to locations within dither template memory 21 is related to the arrangement of bit elements within the pattern array 32. The pattern array 32 is initialized by inputting an arbitrary unordered binary signal sequence of M×N '0' and '1' value bit elements on line 15c, as mentioned above, to provide an unordered binary pattern in the pattern array 32. As mentioned above, while the initial binary sequence is termed 'unordered', the arrangement of '0' value bit elements in the initial binary sequence may be random or may represent a structured pattern. The initial arrangement of '0' and '1' value bit elements in the pattern array is modified by the binary pattern processor 50, as discussed below. The number of '1'—value bit elements may be equal to or greater than the number of '0'—value bit elements although preferably the number of '0' value bit elements exceeds the number of '1' value bit elements. In the case where there are fewer '1' value bit elements, the '1' bit elements are termed minority bit elements, and the '0' bit elements are termed majority bit elements.

The binary pattern processor 50 utilizes the void filter 70 and cluster filter 60 to convert the initial unordered binary pattern of the pattern array 32 into a pattern having uniformly distributed '0' value and '1' value bit elements, that is the '0' and '1' value bit elements are isotopically distributed. The binary pattern processor 50 may be implemented in hardware with programmable logic devices or through software.

The cluster filter 60 locates a minority bit element location in the tightest grouping (cluster) of minority bit elements ("1" value bit elements) in the pattern array 32 while the void filter 70 locates a majority bit element location in the largest spacing (void) between minority bit elements ("0"—value bit elements) in the pattern array 32.

Figure 6:
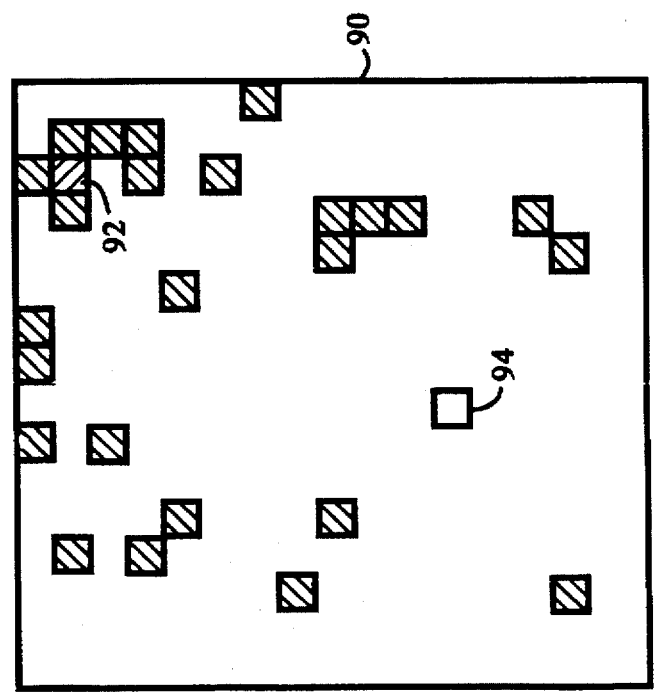
FIG. 6 is a diagram illustrating the location of a minority bit element in the largest cluster by a cluster filter and the location of a majority bit element in the largest void by a void filter.

Referring now to FIG. 6, by way of example, a random pattern 90 with 26 minority bit elements is shown. This pattern 90 is stored in a 16 column×16 row location of pattern array memory 30 (FIG. 5). The cluster filter 60 filters the pattern 90 and determines the location of a minority bit element 92 (shown as the gray shaded pixel 92 in FIG. 6) in the tightest cluster. The void filter 70 also filters the pattern 90 and produces the location of the largest void, as shown by outlined pixel 94.

Referring again to FIG. 5, the cluster filter 60 and void filter 70 can be implemented by applying a modified convolution calculation to obtain a filter result F(x,y) for each bit element at each x,y location of the pattern array 32. The modified convolution calculation for a given pattern array location (x,y), shown below, may be implemented in either hardware or software. The modified convolution below is performed for each element of the pattern array 32 by both the void filter 70 and the cluster filter 60, where each neighboring minority element is equal to 1 and each neighboring majority element is equal to 0.

$$F(x,y) = \sum_{p=-M/2}^{M/2} \sum_{q=-N/2}^{N/2} \text{Pattern Array}(p',q') * f(p,q)$$

where:

$p'=(M+x-p)$ modulo M $q'=(N+y-q)$ modulo N and f(p,q) is a spatial domain function (Equation Set II)

In the above equation, a weighted distribution, f(p,q) provides a relative contribution factor for each of the elements in the pattern array. The p,q indices are adjusted to p',q' to center the x,y index in the weighted distribution f(p,q) and thereby accurately account for each neighboring pixels contribution factor even when the x,y element is located at an edge of the pattern array.

There are many candidate spatial-domain functions which can be used as "cluster filters" and "void filters". For the case of dithering to output devices in which the horizontal and vertical pixel spacings are equal, a symmetric two dimensional Gaussian function is preferably used for f(p,q), where both the p and q dimensions are to be treated equally. Dithering to output devices where the horizontal and vertical pixel spacings are not equal (an asymmetric pixel grid) can also be accomplished by using an asymmetric two dimensional Gaussian function for f(p,q).

The symmetric Gaussian function utilized in the preferred embodiment is defined by:

$$f(p,q) = Ae^{-(p^2/2\sigma_p^2 + q^2/2\sigma_q^2)}$$

(Equation Set III)

Note that $p^2+q^2$ is the distance from the location in question to the neighboring bit element, $\sigma_p=\sigma_q=\sigma$, and A is a constant, in a preferred embodiment σ is approximately 1.5 (in units of bit element spacing).

The cluster filter 60 and void filter 70 each calculate a filter result for each bit element separately. This is accomplished by multiplying the value of each neighboring bit element (i.e. a "1" or a "0") by the Gaussian function, thus taking into account the relative distance from the bit element in question to each neighboring bit element. The result for all neighboring bit elements is summed to form the filter result for the bit element being evaluated. The minority bit elements are given the value of "1" for this calculation, while the majority bit elements are given the value of "0" for this calculation. Because only bit elements with the value "1" will have a filter result that is not equal to "0", in essence it is only the minority bit elements which contribute to the filter result. Thus, the minority bit element with the largest filter result is the location of the largest cluster in pattern array memory 30. Similarly, the majority bit element with the smallest filter result is the location of the largest void in pattern array memory 30.

Figure 7:
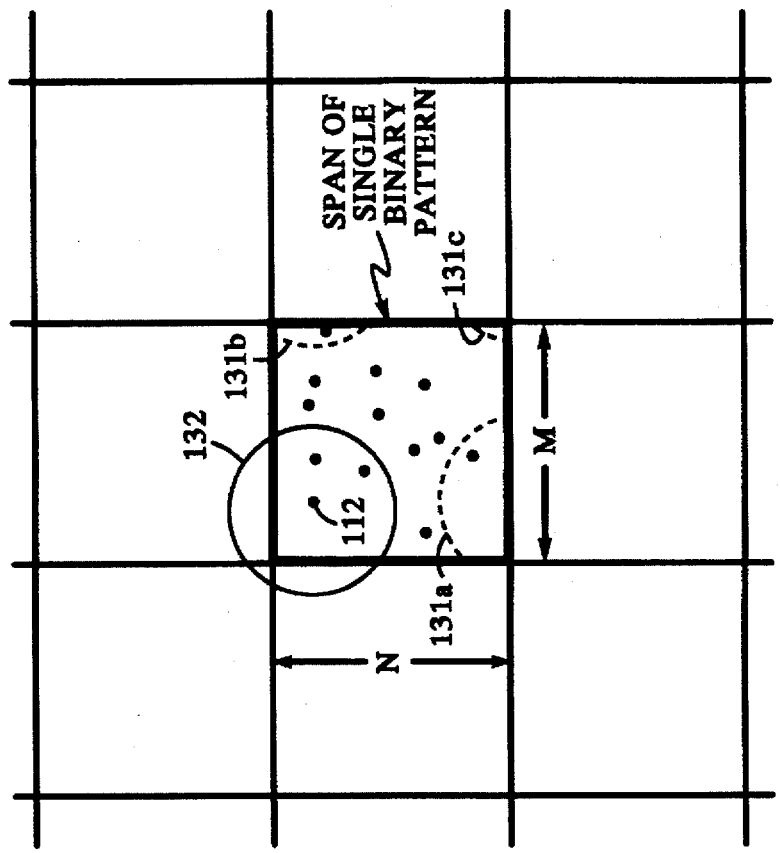
FIG. 7 is a pictorial illustration of the wrap around property of the void and cluster filters used in the void and cluster template generator of FIG. 5.

In addition, the void filter 70 and cluster filter 60 each have a wrap around property, as illustrated in FIG. 7 and apparent from the modulo relationship of p' and q' in the modified convolution equation (Equation Set II above). Thus, when determining the void or cluster characteristic of a certain pattern array location 112, when the span of the cluster or void filter (shown by circle 132) extends beyond the bounds of the pattern array 32, the filter wraps around to the opposite side of the pattern array 32, as indicated by the dashed lines 131a, 131b and 131c. This wrap around property effectively simulates neighboring pattern arrays to accurately locate clusters and voids, even when dealing with the outer edges of the pattern array. Thus the wrap around property of the cluster filter 60 and void filter 70 effectively hinders the emergence of regular and rectangular visual artifacts in the dithered output image by eliminating seams at the edges of the dither array.

Creating a Dither Template

There are two processing steps performed by the void and cluster template generator 20 of FIG. 5 in the generation of integer threshold values for storage in dither template memory 25. The first processing step involves generating a pattern of uniformly distributed '0' value and '1' value bit elements. The second processing step involves generating a dither template of integer threshold values using the uniformly distributed, isotropic pattern. Each of these processing steps is described below, with references to flow diagrams detailing the steps necessary to complete each process.

Generating a Uniformly Distributed Binary Pattern

Figure 8:
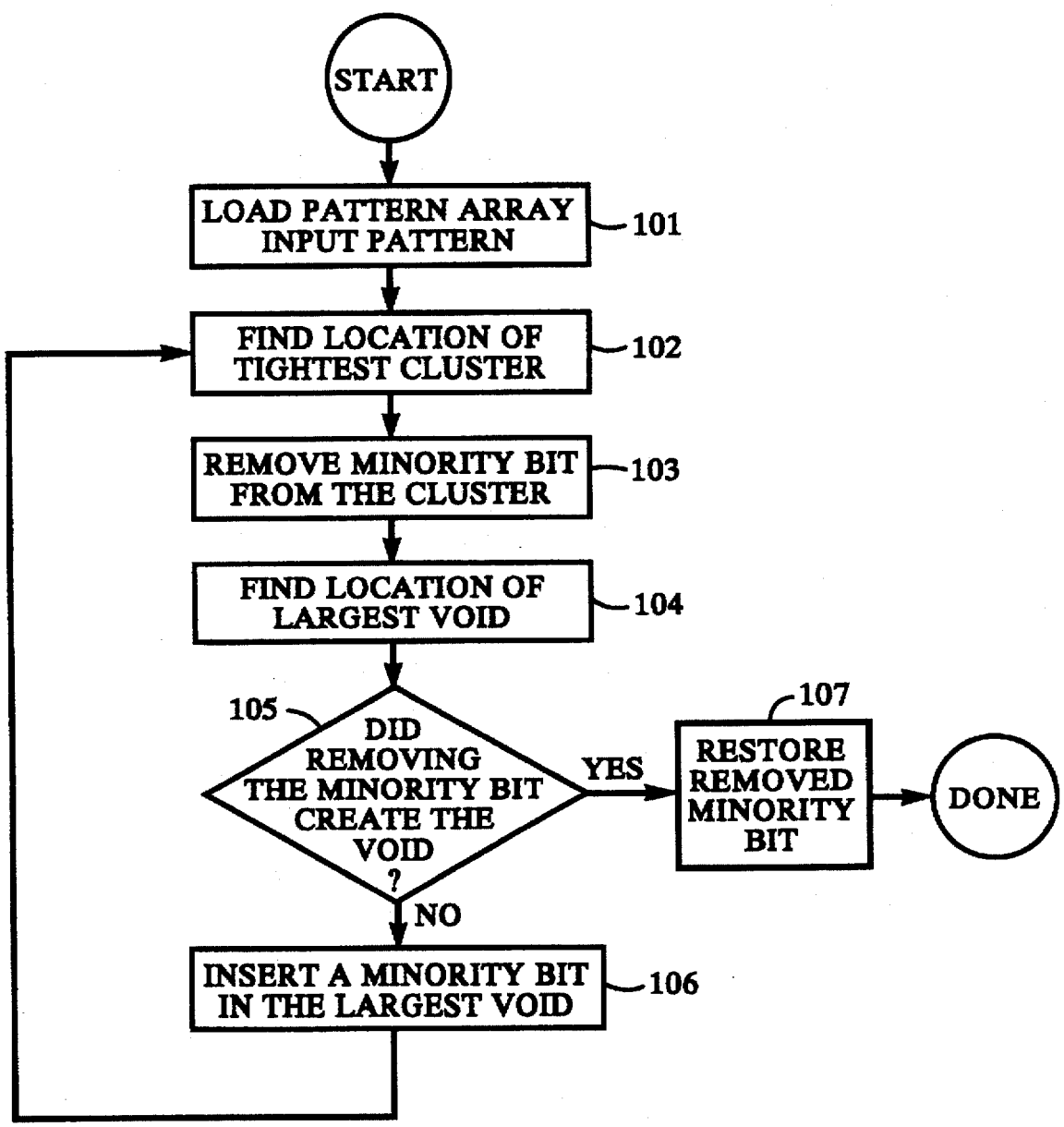
FIG. 8 is a flow diagram illustrating the steps performed to generate a homogeneous pattern array for the void and cluster template generator of FIG. 5.
Figure 9:
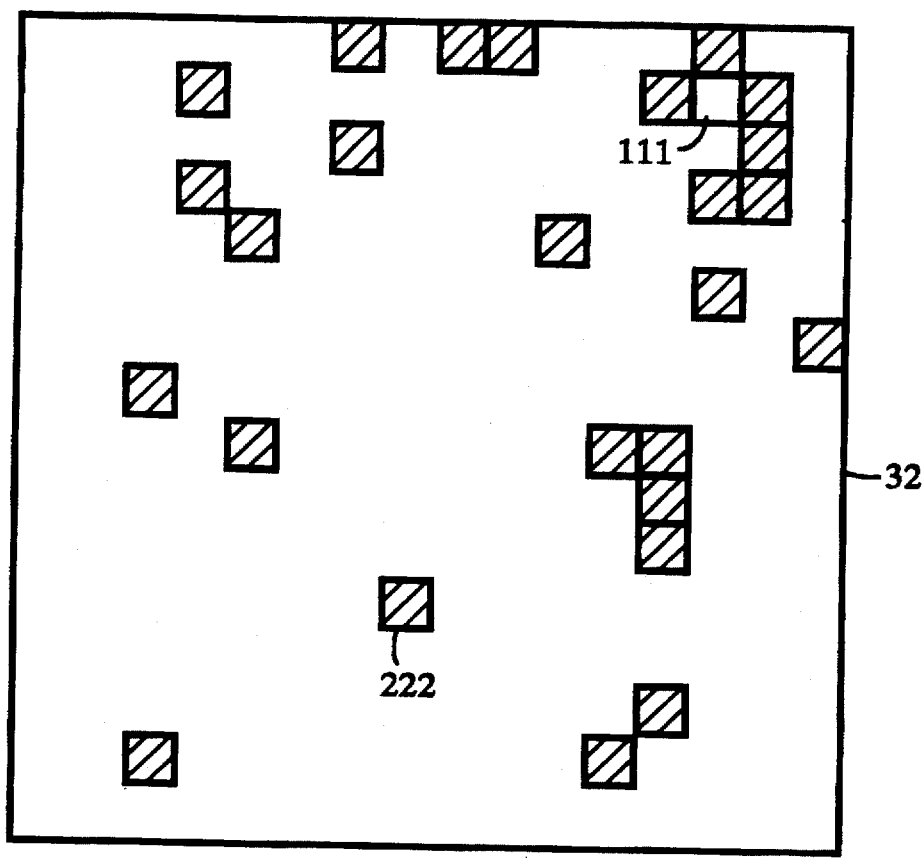
FIG. 9 is a diagram illustrating the location of a minority bit element by a cluster filter, the location of a majority bit element by a void filter and the movement of a minority bit element to a majority bit element location in the pattern array by a binary pattern processor.

Referring now to FIG. 8, a flow diagram displaying the logical operation of an embodiment of the binary pattern processor 50 of FIG. 5 is shown, and will be described with references to FIGS. 5,9 and 10, the latter two figures depicting typical outputs of the binary pattern processor 50. As mentioned above, a binary signal sequence on line 15c is loaded into pattern array memory 30. The binary signal sequence is arbitrary, it may be structured, but is preferably unordered, providing an unordered binary pattern 90 (FIG. 6) at step 101. By way of example, the random pattern 90 (FIG. 6) with 26 minority bit elements in a 16×16 pattern array 32 is used.

At step 102, the binary pattern processor 50 (FIG. 5) enables the cluster filter 60 a by asserting a NEXT CLUSTER signal on line 58 to initiate location of the minority bit element location of the tightest cluster. The cluster filter 60 operates on the pattern array 32, to provide the location of a minority bit element in the tightest cluster, and supplies the row and column location of that minority bit element to the binary pattern processor 50 over the cluster row/col line 62 shown in FIG. 5. At step 103, the binary pattern processor 50 uses the cluster row/col information to remove the minority bit element from the array 32 and replace the removed minority bit element at the determined row/col with a majority bit element. This is shown in FIG. 8 and shown in FIG. 6, where the lightly shaded pixel 92 is the selected minority bit element.

At step 104, upon insertion of the new majority bit element in the pattern array 32, the binary pattern processor 50 enables the void filter 70 by assertion of a NEXT VOID signal on line 56 to initiate location of a majority bit element in the largest void. The void filter 70 also filters the pattern array 32, supplying a row and column location of the largest void in the pattern array 32 to the binary pattern processor 50 over the void row/col line 72 as shown in FIG. 5 and represented by the enclosed bit element 94 in FIG. 6. At step 105 in FIG. 8, the binary pattern processor 50 determines whether the location supplied by the void filter 70 is the same as the location most recently supplied by the cluster filter 60. If the two locations are determined in step 105 not to be the same, then the binary pattern processor 50 inserts a minority bit element in the pattern array 32 at the location previously occupied by a void supplied by the void filter 70 at step 106. This is shown by example in FIG. 9.

However, at step 107, if the two locations are the same, the binary pattern processor 50 restores the minority bit element at the location of the pattern array 32 from which it was removed, i.e. the location most recently supplied by the cluster filter 60. That is, the removal of the minority bit is determined to have provided the largest void and the processing of the void and cluster filters to produce the pattern with homogeneous attributes is "done". When the removal of a minority bit element by the cluster filter 60 creates the largest void, the '0' value and '1' value bit elements are uniformly distributed throughout the pattern array 32, (that is the elements are isotopically distributed in all directions) and the pattern array 32 is said to possess homogeneous attributes.

Figure 10B:
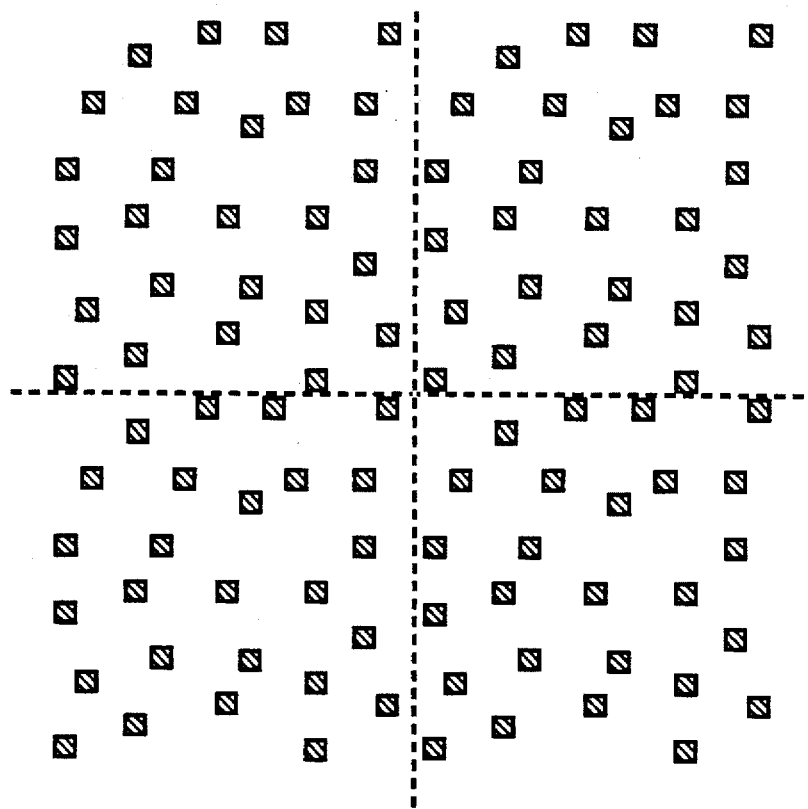
FIG. 10 illustrates an example of a pattern array before and after being processed by the binary pattern processor.
Figure 10A:
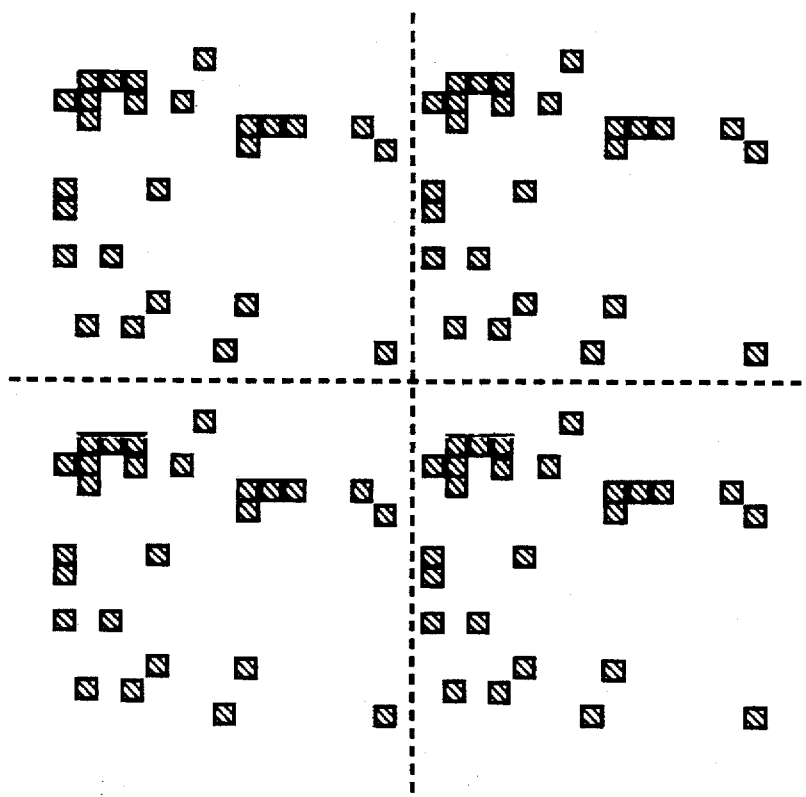

Referring now to FIG. 10, an example illustrating the translation of the random input pattern of FIG. 6 into a uniform distribution of bit elements is shown. The 16×16 random input pattern in FIG. 6 is tiled four times to cover an area of 32×32 pixels as indicated in 10A, where the edges of the tiles are indicated by the dashed lines. The output from the binary pattern processor 50 is shown in FIG. 10B, where the edges of each of the uniformly distributed pattern arrays are also indicated by dashed lines. FIG. 10B illustrates the effectiveness of the wrap around property of the filters in producing a uniform distribution of bit elements with homogeneous attributes. Consequently, because the uniform distribution of bit elements within the pattern array was determined by simulating neighboring pattern arrays using the wrap around property, when a pattern array is tiled over an input image, the boundaries between pattern arrays are indiscernible, as seen in FIG. 10B.

Generating a Dither Template using the Uniformly Distributed Pattern Array

Figure 11:
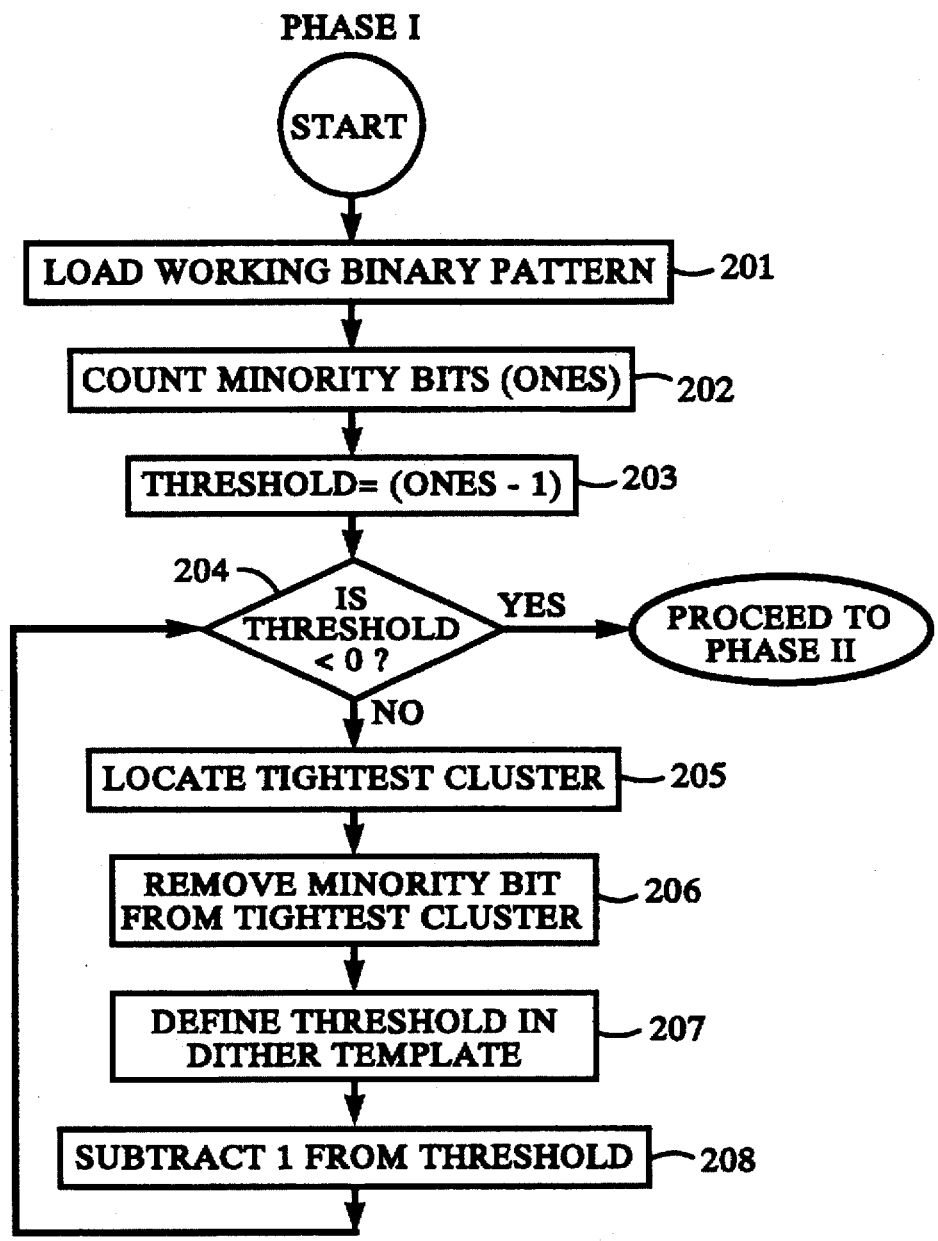
FIGS. 11, 12 and 13 are flow diagrams illustrating the steps for assignment of threshold values to the locations in the dither matrix.
Figure 12:
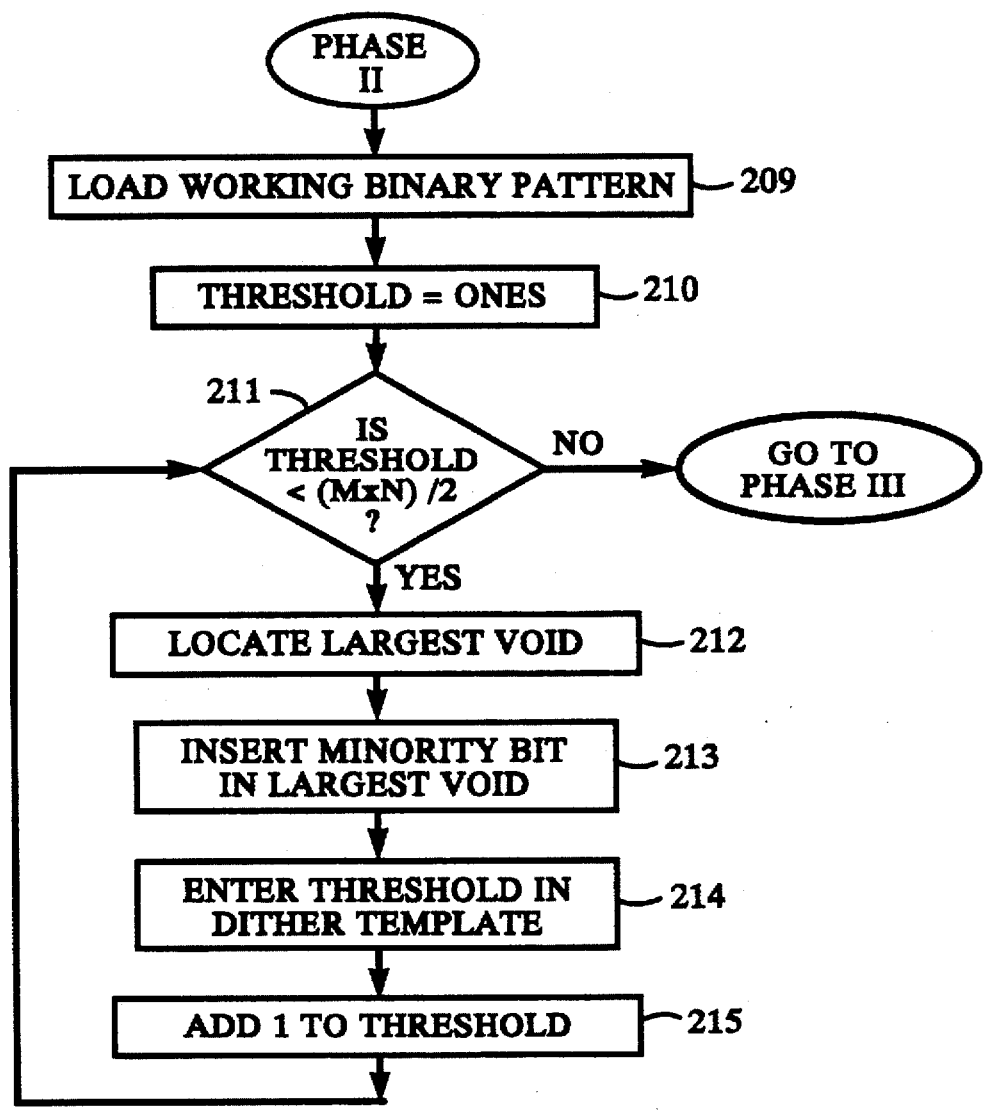
Figure 13:
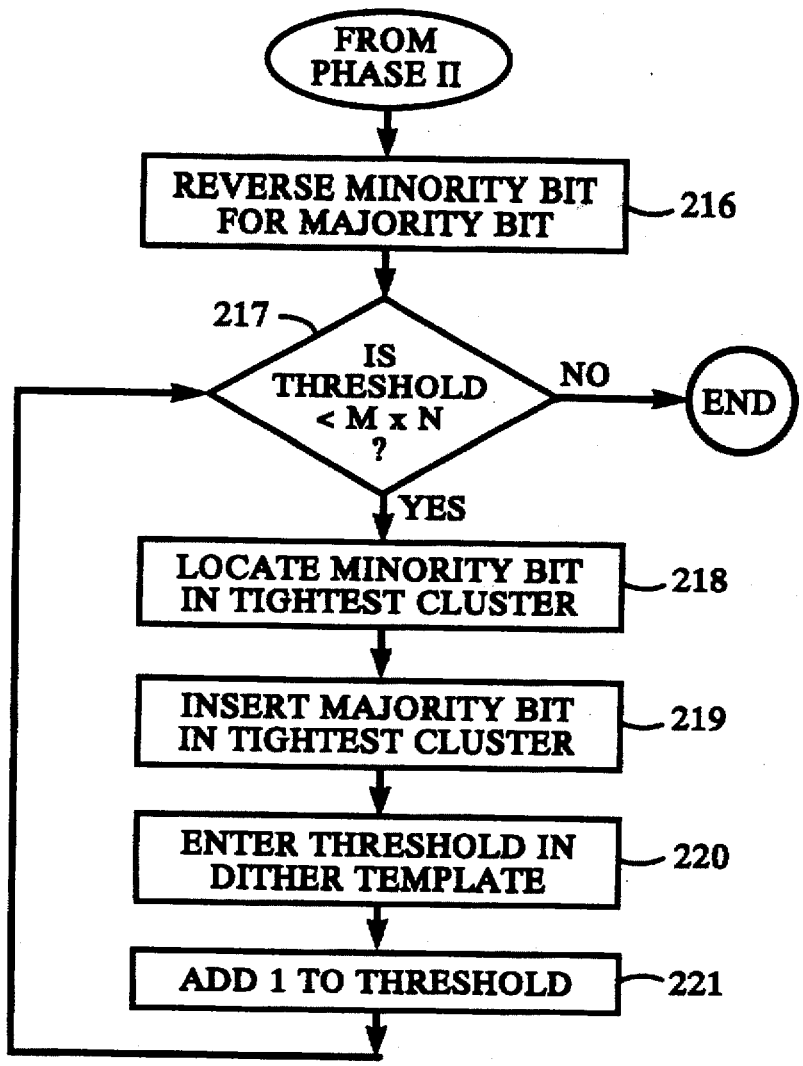

Referring now to FIGS. 11–13, when the '0' value and '1' value bit elements are uniformly distributed throughout the pattern array 32, the binary pattern processor 50 signals the dither template processor 80 by asserting a signal "DONE" on line 53. The dither template processor 80 then begins a three phase process, acting together with the working pattern array 42, the cluster filter 60, and the void filter 70, to supply threshold values to each location of dither template memory 25. FIGS. 11, 12, and 13 illustrate the logical flow of each of the three phases of the dither template processor 80.

Phase I

In phase I, as shown in steps 201 through 203 of FIG. 11, the dither template processor 80 loads binary bit elements from the pattern array memory 30 (the unordered pattern that was processed to provide a pattern having homogeneous attributes), into the working binary pattern memory 40. The dither template processor 80 counts the number of minority bit elements in the working binary pattern memory 40, and at step 202 stores this value in a register "ONES". The value of ONES is decremented by the binary value one at step 203, and assigned to the signal "THRESHOLD" on line 85 of FIG. 5. For example, using the pattern array of FIG. 6, which has 26 minority bit elements in each pattern array, the value of "ONES" is equal to 26, and the original "THRESHOLD" value is 25.

At the start of Phase I, although the pattern array possesses homogeneous attributes, the filter result of each bit element is not identical. As shown in steps 205 through 207 of FIG. 11, upon assertion of the NEXT CLUSTER signal on line 58 by the dither template processor 80 in FIG. 5, the cluster filter 60 operates on the bit elements in working binary pattern memory 40, calculating a filter result for each bit element, locates a minority bit element location of the tightest cluster, and supplies that cluster row/col location over line 62 to the dither template processor 80 in step 205. The first bit element located by cluster filter in Phase I will be the last bit element located by the working binary pattern processor 50, i.e., the minority bit element in the largest cluster which when removed produced the largest void. The dither template processor 80 replaces the minority bit element existing at that location with a majority bit element in step 206, and in step 207 enters the value of THRESHOLD (25 in this example) over line 85 in the corresponding location of the dither template memory 25. The value of THRESHOLD is then decremented by one in step 208.

The cluster filter 60 continues calculating the filter result for each bit element while supplying minority bit element cluster row/col locations over line 62 to the dither template processor 80, and the processor 80 continues to remove minority bit elements from the supplied location on line 62 and decrements the THRESHOLD value by one (steps 205 through 208 in FIG. 10). This process is repeated until THRESHOLD=0, at which point there are no remaining minority bit elements in the working binary pattern memory 40, and 26 locations of dither template memory 25 of this example have been assigned threshold values between 0 and 25. The dither processor 80 then proceeds into the second phase of operation.

Phase II

In phase II, as shown in FIG. 12 in step 209, the dither template processor 80 again loads the working binary pattern memory 40 with values from pattern array memory 30. In step 210 the THRESHOLD signal is assigned the value of ONES (26 in this example). As shown in steps 212 through 215 of FIG. 12, upon assertion of the NEXT VOID signal over line 56 by the dither template processor 80, the void filter 70 filters the working binary pattern 42 by calculating the filter result for each bit element, locates a majority bit element location of the largest void, and in step 212 supplies the row/col location of that void over line 72 to the dither template processor 80. The dither template processor 80 replaces the majority bit element at that void row/col location with a minority bit element in step 213, and in step 214 enters the value of THRESHOLD (26 in this example) over line 151 in the corresponding location of dither template memory 25. The value of the THRESHOLD signal is then incremented by one in step 215, making the THRESHOLD signal of the example equal to 27. The void filter 70 continues calculating filter results for each element of the working binary pattern, supplying majority bit element void row/col locations on line 72 to the dither template processor 80, while the processor 80 continues adding minority bit elements at the supplied location of line 72, and incrementing THRESHOLD (steps 212 through 215 in FIG. 12) until THRESHOLD>=half the total number of locations in the dither template memory 25. In this example, wherein the dither template contains 16×16 (256) locations, threshold values between 26 and 127 have been assigned to locations within the dither template memory 25 by the end of phase II. The working binary pattern 42 is preserved for use in phase III.

Phase III

At this point (because more than half the bit elements have the original minority bit element value, '1' in the preferred embodiment) the previous characterization of "minority bit element" is reversed from the bit element value '1' to the bit element value '0', as shown in step 216 of FIG. 13, and the dither processor 80 proceeds into the third phase of operation. Therefore, the cluster filter, which originally searched for '1'-value bit elements searches for '0' value bit elements in phase III. Likewise, the void filter, which originally searched for '0'-value bit elements searches for '1' value bit elements in phase III. It should be noted, however, that although the cluster filter 60 is searching for '0' value bit elements, the '0' value bit element, because it is the minority bit element, will be assigned a '1' value for the modified convolution calculations. Likewise, although the majority bit elements now have an bit element value of '1', because they are a majority bit element, they will be assigned a '0' value for modified convolution calculations. Thus, the cluster filter 60 and void filter 70 search for the minority and majority bit elements regardless of their bit element values.

As shown in steps 218 through 221 of FIG. 13, upon assertion of the NEXT CLUSTER signal over line 159 by the dither template processor 80, the cluster filter 60 filters the working binary pattern 42, locates a minority bit element location of the tightest cluster, and in step 218 supplies the cluster row/col location over 62 to the dither template processor 80. The dither template processor 80 replaces the minority bit element at that cluster row/col location with a majority bit element in step 219, and in step 220 enters the existing value ((M×N)/2, or 128 in the current example) of the THRESHOLD signal 151 in the corresponding location of dither template memory 25. The value of the THRESHOLD signal is then incremented by one ((M×N)/2+1, or 129 in the current example) in step 221. The cluster filter 60 continues to calculate filter results for each bit element and supply minority bit element cluster row/col locations over line 62 to the dither template processor 80, while the processor continues to remove minority bit elements and insert majority bit elements, and increment THRESHOLD (steps 218 through 221 in FIG. 12) until THRESHOLD= M×N (256 in the current example), at which point there are no remaining minority bit elements in the working binary pattern 42, and consequently every location in dither template memory 25 has been assigned a threshold. In phase III, therefore, threshold values between 128 and 255 were assigned to dither template memory 25.

At this point, dither template memory 25 has been generated for use within the dithering system 14 of FIG. 3. The thresholds of the dither template memory 25, because they were generated from a uniformly distributed pattern of bit elements, are also uniformly distributed throughout dither template memory 25. Due to the uniform distribution of thresholds within the dither template memory 25, the resultant output image generated using dither template memory 25 possesses minimal low frequency spatial characteristics. In addition, a small dither template (32×32 for example) may be used in the dithering system without facilitating the regular visual artifacts commonly found in ordered dithering.

Figure 14B:
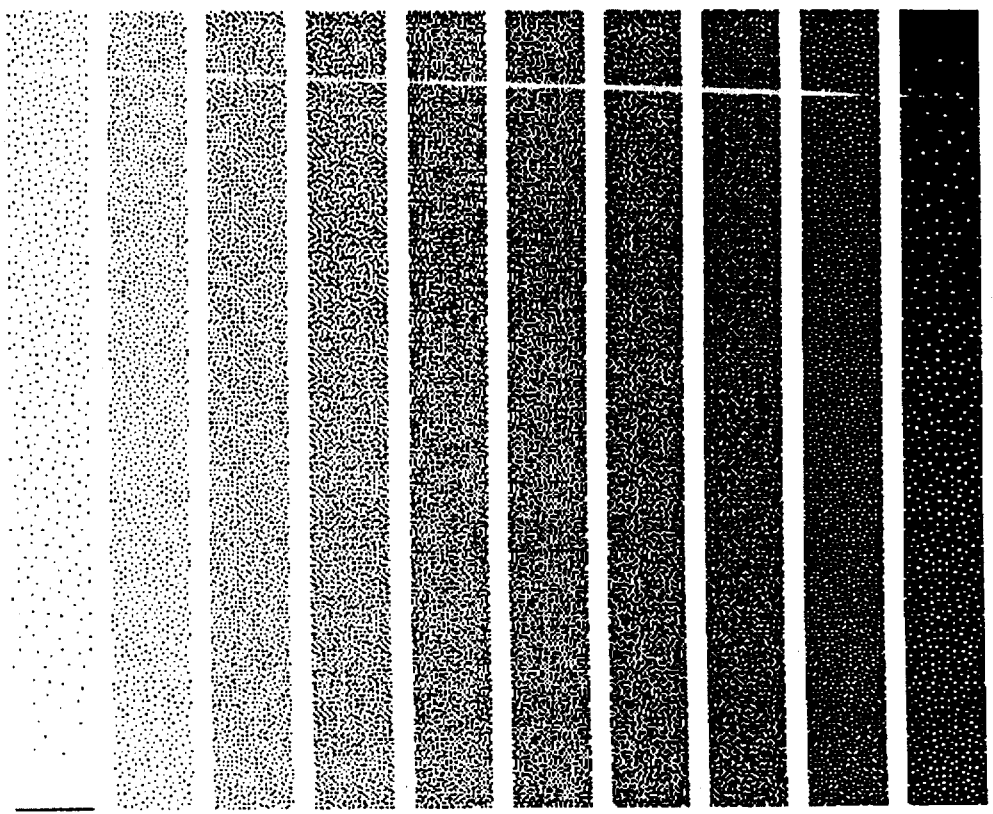
FIGS. 14A and 15A are rendered using a prior art ordered dither matrix and FIGS. 14B and 15B are rendered using the present invention.
Figure 14A:
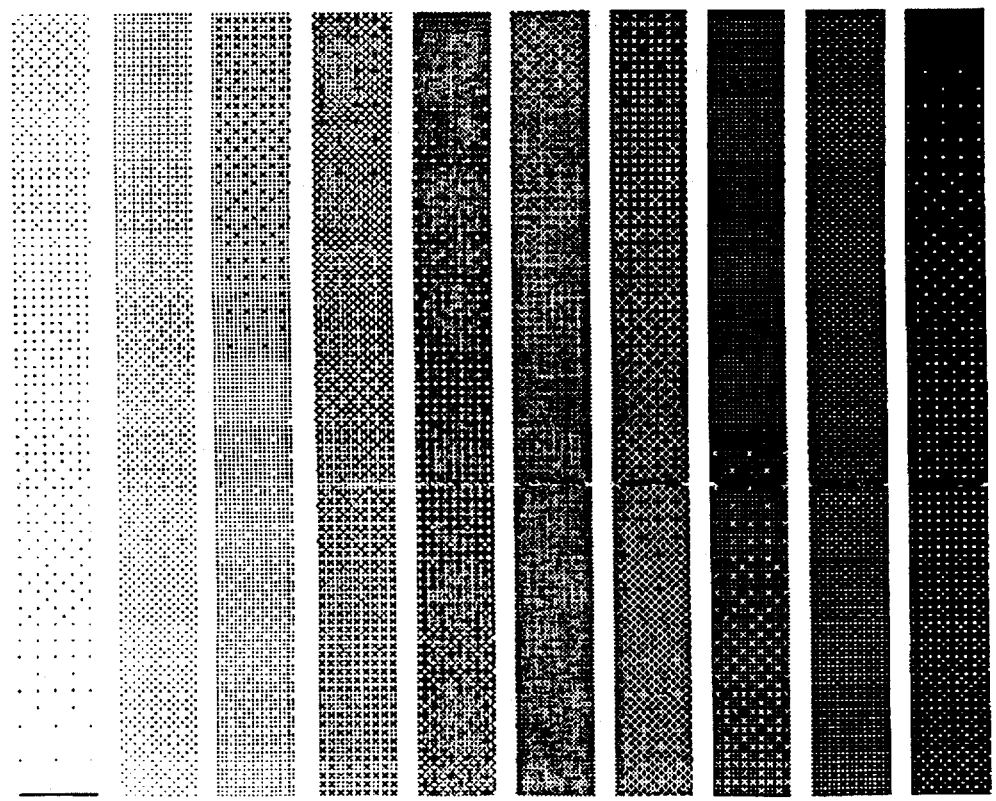

Referring now to FIGS. 14A and 14B, two output images displaying a "gray scale" are shown. The output images are generated from a common input image using a system as described with reference to the dithering system 14 of FIG. 3. The gray scale illustrates the range of various color levels that the output device is able to simulate utilizing only black and white bit elements. In the gray scale of FIG. 14A, provided using a prior art ordered dither template, various distracting visual patterns can be seen as the color level varies from white to black. The visual patterns are a result of the ordered structure of the prior art dither matrix.

Distracting visual artifacts however are insignificant in the gray scale of FIG. 14B due to the uniform distribution of thresholds in a dither template generated as described with reference to the embodiment of the invention illustrated by FIGS. 5–13.

Figure 15B:
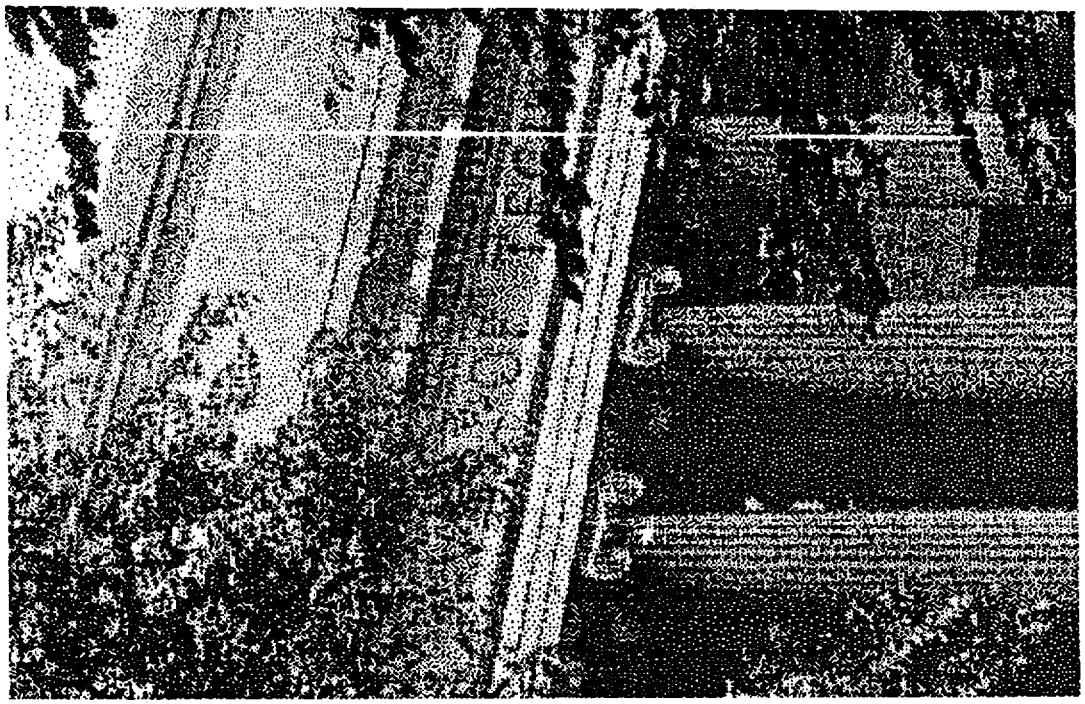
Figure 15A:
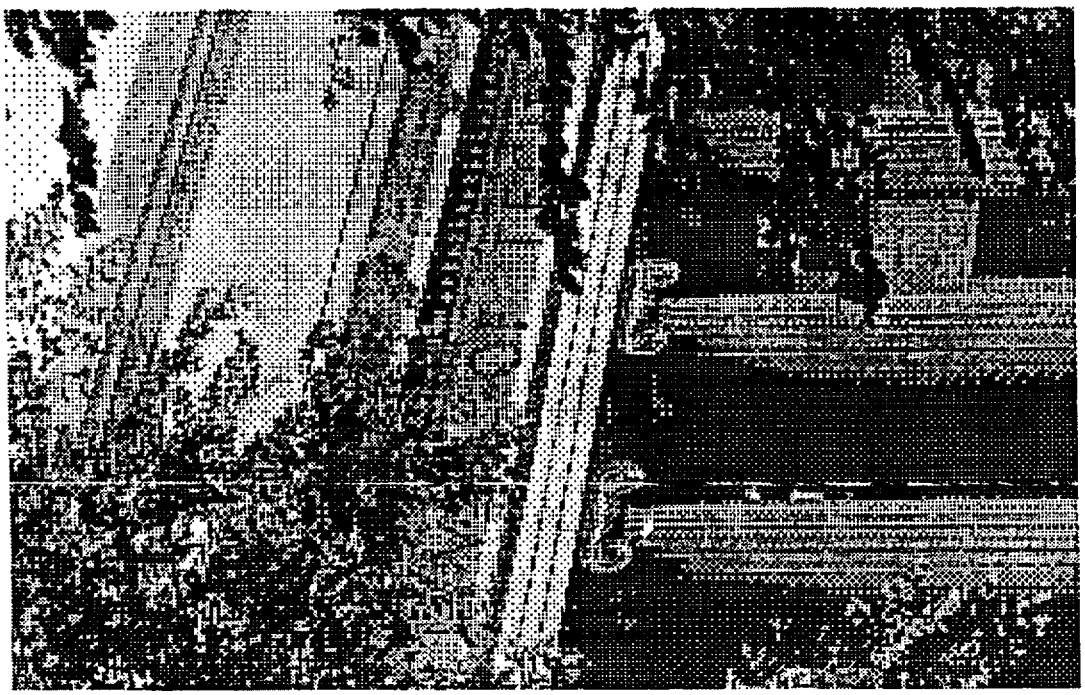

Referring now to FIGS. 15A and 15B, two output images generated using the same input image are shown. The visual artifacts inherent in the prior art ordered dithering method due to the ordered structure of the dither matrix used to render FIG. 15A detract from the rendition of the input image by adding regular structures to the output image.

In contrast, as shown in FIG. 15B, the output image rendered by an embodiment of the invention employing a dither template as described with reference to FIGS. 5–13 has few artifacts. This is due both to the uniform distribution of the thresholds within the dither template as well as the wrap-around property of the void and cluster filters, which serve to eliminate visible edges as the dither template is tiled over the image. Subsequently, a significantly more accurate and visually pleasing re-creation of the texture and definition of the input image is rendered on the output device.

While there has been shown and described a preferred embodiment of this invention, it is to be understood that various adaptations and modifications may be made within the spirit and scope of the invention as defined by the claims.

What we claim is:

1. A method for generating an output image having a first number of representation levels from an input image having a second, greater number of representation levels, said method comprising the steps of:

storing, in a memory, a dither template comprising an array of elements representing a uniform distribution of integer threshold values, the dither template elements being generated by a plurality of patterns, each pattern having a plurality of elements, each element having a value, wherein the value of each element of said patterns is determined by filtering said pattern; and determining, for each input image pixel, responsive to a value of said each input image pixel and responsive to an integer threshold value at a location of said dither template corresponding to said location of said each input image pixel, an output image pixel value.

2. The method according to claim 1, wherein each element of said pattern is determined from a random pattern of distributed majority, first type elements and minority, second type elements.

3. The method according to claim 2, wherein the step of generating a dither template further comprises the steps of:

generating a working binary pattern having a plurality of elements, each element having either a first value or a second value by filtering a random pattern to rearrange said elements of said pattern.

4. The method according to claim 3, wherein said working binary pattern is filtered to provide a plurality of patterns for providing integer threshold values for said dither template.

5. The method according to claim 3, wherein said step of providing a plurality of other patterns further comprises the steps of:

generating one or more patterns with fewer elements having the maximum value than the working binary pattern; and generating one or more patterns with fewer elements having the minimum value than the working binary pattern.

6. The method according to claim 5, wherein said working binary pattern is filtered once for each element of said dither template, the output providing a plurality of filtered patterns, where the result of each filtering operation identifies a threshold value for one of said elements of said dither template.

7. The method according to claim 3, wherein said step of generating a working binary pattern further comprises the steps of:

copying said random pattern as the starting pattern to said working binary pattern;

filtering said working binary pattern;

identifying from the filtered output a first position of a first element of said working binary pattern with a largest value as the maximum position;

identifying from the filtered output a second position of a second element of said working binary pattern with a smallest value as the minimum position;

exchanging elements in the maximum and minimum position of said working binary pattern; and repeating from the step of "copying" until the elements of the working binary pattern are isotopically distributed.

8. The method according to claim 3, where said filtering is performed using a symmetric filter.

9. The method according to claim 8, wherein said filter is a guassian filter given by the equation:

$$f(p,q) = Ae^{-(p^2/2\sigma_p^2 + q^2/2\sigma_q^2)}$$

wherein that $p^2+q^2$ is the distance from said element for which F(x,y) is provided to a neighboring element, $\sigma_p = \sigma_q = \sigma$, and A is a constant.

* * * * *